United States Patent Office 3,505,434
Patented Apr. 7, 1970

3,505,434
METHOD OF PRODUCING SPHERICAL
POLYMER PARTICLES
Hendrik A. J. Battaerd, North Clayton, Victoria, Australia, assignor to Imperial Chemical Industries of Australia and New Zealand Limited, Melbourne, Victoria, Australia, a company of Australia
No Drawing. Filed Dec. 11, 1967, Ser. No. 689,323
Claims priority, application Australia, Dec. 29, 1966, 15,885/66
Int. Cl. B29b 3/02
U.S. Cl. 264—15
13 Claims

ABSTRACT OF THE DISCLOSURE

A process for making essentially spherical particles of thermoplastic polymer material in which non-spherical particles of the polymer are mixed and mildly stirred in a non-reactive, non-solvent liquid with a dispersing agent. The mixture is then heated to 20° C. above the polymer melting point and stirred, causing the polymer particles to attain a spherical or nearly spherical shape, but not to agglomerate. The particles are then cooled below their melting point.

---

This invention relates to a process for the manufacture of shaped particles and in particular relates to a process for the manufacture of spherical particles of thermoplastic polymeric substances.

It is known that thermoplastic polymers may be used in the finely divided or powdery state for certain industrial applications where it is either impossible or inconvenient to use materials in the shape for example of cubic pieces or pellets and that these thermoplastic polymers may be obtained in powdery form, in which the particles are in the form of spheres, by a granular polymerisation process. It is also known that thermoplastic polymers may be converted to powders containing spherical particles by the dispersion, after polymerisation, of the molten polymer in water under the influence of vigorous stirring and shearing action in the presence of dispersing agents and/or stabilisers and at elevated temperatures and pressures. The above method suffers from a number of disadvantages. The final size and shape of the particles is very dependent on the method of stirring and the degree of shearing action imparted during the process. Since the process is performed at elevated pressures the manufacture of suitable process equipment is more expensive than if the process were to be operated at atmospheric pressure.

We have now found that the disadvantages outlined above may be minimised and thermoplastic polymeric materials may be converted to a powdery form wherein the particle shape is spherical or substantially spherical by means of a process wherein a thermoplastic polymeric material is dispersed in a liquid medium which is non-reactive with and is not a solvent for said polymer, heated at atmospheric pressure to a temperature at which the polymeric material is molten, maintained at this temperature for a time, followed by cooling below the melting point of the polymeric material and separating the resultant spherical particles in a manner known "per se."

Accordingly we provide a process for the manufacture of substantially spherical polymeric particles which comprises dispersing under mild stirring conditions solid non-spherical thermoplastic polymeric particles in a liquid medium which is non-reactive with and is not a solvent for said polymer in the presence of at least one dispersing agent heating said dispersion at atmospheric pressure at a temperature sufficient to melt said thermoplastic polymer but not more than 20° C. above the melting point of said thermoplastic polymer while preventing agglomeration of the particles introduced by a sufficiency of dispersing agent, maintaining it at said temperature at least until the polymer particles attain a spherical or substantially spherical shape, then cooling said particles to a temperature below the melting point of said polymer and separating the resultant particles from said liquid medium. The original polymeric material may be of varying particle size or optionally may be of uniform or substantially uniform particle size. Although the original polymeric particles are usually of irregular shape, it is within the scope of our invention to manufacture spherical particles from polymeric particles of regular shape.

Thermoplastic polymeric materials suitable for use in accordance with our invention include thermoplastic polymeric substances which are normally in the solid state at ambient temperatures and which have a decomposition temperature above their fusion temperature, said fusion temperature being below the temperature to which the liquid medium, hereinbelow defined, may be heated without decomposition. The thermoplastic polymeric materials may include for example polyolefins, polyvinyl halides, polyvinyl esters, olefinvinyl copolymers, polyacrylics and polystyrenes.

Polyolefins which are suitable for use with out invention may include for example the normally solid polymers of olefins and more particularly the mono-alpha olefins containing from 2 to 6 carbon atoms such as for example polyethylenes, polypropylene, polybutene, polyisobutylene and poly(4-methylpentene). A preferred compound is polyethylene and more especially those polyethylenes of which the specific gravity is between 0.912 and 0.965 g./cm.$^3$.

It is especially noted that the present process is not limited to polyethylenes of low molecular weight but that it is suited to all commercially available polyethylenes.

Vinyl polymers suitable for use in accordance with our invention may be for example polyvinyl chloride, polyvinyl acetate and copolymers of polyvinyl chloride and polyvinyl acetate.

Olefin-vinyl copolymers suitable for use in our invention include for example poly(ethylene-co-vinyl acetate), poly(ethylene-co-vinyl propionate), poly(ethylene-co-vinyl isobutyrate), poly(ethylene-co-methyl acrylate), poly(ethylene-co-ethyl acrylate) and poly(ethylene-co-ethyl methacrylate). By poly(ethylene-co-vinyl acetate), for example, we mean a random copolymer of ethylene and vinyl acetate and the use of "-co-" hereinbefore and hereinafter designates random copolymers.

Of these olefin-vinyl copolymers, poly(ethylene-co-vinyl acetate) is preferred, particularly those copolymers in which ethylene constitutes the greater part by weight of copolymer, for example between 51 and 96% w./w. of the copolymer.

The acrylic resins suitable for use in the invention include polymethyl methacrylate, polymethyl acrylate, polyethyl acrylate and polyethyl methacrylate. Polymethyl methacrylate is preferred.

The thermoplastic polymers may also if desired be compounded or blended by known means with other materials such as for example plasticisers, stabilisers, pigments or fillers prior to being dispersed in a manner according to our invention.

The liquid medium in which the thermoplastic particles are dispersed may be of the aqueous or non-aqueous type or it may sometimes be convenient to use both aqueous and non-aqueous liquids in combination. The liquid medium must be such that it can be heated to a temperature at least as high and preferably higher than the temperature at which the dispersed thermoplastic polymeric particles become molten without decomposition of the said liquid medium. Furthermore under the operating conditions according to our invention the liquid medium should not interact nor dissolve or attack either the thermoplastic polymer or any solutes which may be added to the liquid medium for example salts, surfactants, dispersants or stabilisers. The choice of liquid medium depends on the type of polymeric material to be dispersed and its melting point. Although pure liquids may be used by themselves we prefer that our liquid media contain at least one solute. Thus for example if the melting point of the polymer is in excess of 100° C., suitable liquid media may be prepared by making solutions in water of suitable inorganic or organic compounds of such concentration that the resultant solution remains a liquid and does not decompose at a temperature at least equal to and preferably above the melting point of the polymer.

The choice of compound used in the preparation of the liquid medium in order to form a suitable solution having for example a boiling point differing from that of the solvent itself is not narrowly critical. For example suitable inorganic compounds may be selected from the table listing physical constants of inorganic compounds set out in the Handbook of Chemistry and Physics, 46th edition, 1965–66, pp. B148–B241, published by The Chemical Rubber Co., Cleveland, Ohio, U.S.A. The appropriate concentration of the chosen inorganic compound to give a suitable liquid medium may be calculated using known methods applied in physical chemistry; for example one parameter which could be calculated is the boiling point of the aqueous solution of the inorganic compound. Suitable inorganic compounds may be for example salts of alkali metals, alkaline earth metals, titanium, vanadium, chromium, manganese, iron, cobalt, nickel, copper, zinc, aluminum, tin, lead or bismuth and of these salts we prefer the anion to be selected from the group consisting of the halides, nitrates, nitrites, hydroxides or sulphates. A more preferred salt is calcium chloride. Other suitable compounds are salts derived from alkali metals or alkaline earth metals and carboxylic acids for example acetic acid.

Suitable organic compounds are those which are soluble in water and which may include for example alkanols, for example ethanol or propanol, and polyhydric alcohols such as glycerol.

The stabilisers, dispersing agents and surfactants suitable for use in accordance with the present invention are not narrowly critical. They should be stable at the temperatures required and should not interact with the liquid dispersing medium or with the polymer. Furthermore the stabilisers, surfactants and dispersive agents used should be capable of being washed from the polymer particles to suitably low residual values.

Suitable stabilisers, dispersing agents and surfactants can be chosen for example from polyvinyl alcohols of varying molecular weights and degrees of hydrolysis, gelatines, graft copolymers of low molecular weight olefins with acrylic and methacrylic acid, and block copolymers of ethylene oxide and propylene oxide of various molecular weights and proportions of the monomers. These agents may be used alone or in combination with each other and/or in combination with various mineral powders such as for example asbestos powder, colloidal silicas, clays, siliceous earths, aluminous earths and bentonite.

It is known that block copolymers of the type ABA, where for example A is a polyethylene oxide block and B a polypropylene oxide block, of a minimum molecular weight of 3500 and including a greater proportion in weight of ethylene oxide than propylene oxide are effective in the temperature range of 160° to 325° C.

Other suitable compounds include several non-ionic agents with surface activity sold by Wyandotte Chemicals Corporation under the registered trademarks "Pluronic" and "Tetronic." We have now found that some of these surfactants are operative at temperatures from about 60° to about 180° C. when used to stabilise dispersions of polymer powders in the solid state and when molten.

One of the compounds found suitable, for example, was "Pluronic" F98 in which a polyoxypropylene block of average molecular weight of 2700 is polymerised with 4 parts of ethylene oxide to give a product of molecular weight of approximately 13,500 and which consists substantially of a block copolymer ABA, where B represents a polyoxypropylene block of molecular weight of 2700 and A are polyoxyethylene blocks with an approximate molecular weight of 5400 each.

Other examples of the "Pluronic" range which are also satisfactory include:

"Pluronic" P105, average MW 6,500, 50% ethylene oxide
"Pluronic" F88, average MW 11,250, 80% ethylene oxide
"Pluronic" F108, average MW 16,250, 80% ethylene oxide
"Pluronic" P85, average MW 4,500, 50% ethylene oxide
"Pluronic" F68, average MW 8,750, 80% ethylene oxide We have also found that block copolymers of the type BA with similar molecular weights and proportion of ethylene oxide and propylene oxide as the corresponding "Pluronic" compounds are effective.

It is similarly possible to use as dispersive agents or surfactants compounds commercially available under the name "Tetronic" (registered trademark). These compounds are believed to be prepared by reacting chains of block copolymers of ethylene oxide and proplyene oxide onto a nucleus of ethylene diamine. "Tetronic" 707, molecular weight 12,000, 70% ethylene oxide, and "Tetronic" 708, molecular weight 27,000, 80% ethylene oxide are suitable. In general block copolymers of the type ABA and BA as hereinbefore defined with a molecular weight of 10,000 or greater and containing a major proportion by weight of ethylene oxide in the copolymer and coupled to an ethylene diamine nucleus have been found to be suitable.

Dispersions of thermoplastic polymers according to our invention may be prepared over a wide range of temperatures dependent on the melting point and other physical characteristics for example the molecular weight or density of the thermoplastic polymeric material being dispersed. Thus for example suitable dispersions of polyethylene which has a density of 0.919 and a melt flow index of 2, as determined by the method set down in ASTM, D1238–52T, were obtained at temperatures between 105° and 120° C., whilst for a polyethylene having the same melt flow index but a density of 0.935, suitable dispersions were obtained in the temperature range from 129° to 141° C. We have found that temperatures in the range from 60° C. to 180° C. have been satisfactory and preferably the temperature is in the range from 100° C. to 175° C. Suitable particles may be obtained if the process according to our invention is carried out at atmospheric pressure.

We have found that, depending on the nature of the polymer being dispersed and the temperature and type of the dispersing medium used to bring the polymer into the molten state, the period of time required for the polymeric material to reach such a state so that it forms spherical particles when the dispersing medium and molten polymer are subsequently cooled may vary. This time may, in some instances, be as short as one second and as long as 20 minutes. Often this time is between 15 seconds and 5 minutes and more usually between 30 seconds and 2 minutes. We have found that this residence time is affected only slightly by variations in the molecular weight of the polymer. The polymer should be added in the solid state to the dispersing medium. The degree of stirring should be mild only, i.e. sufficient to achieve a substantially uniform temperature throughout the contents of the reaction vessel but at the same time not so vigorous as to cause the particles of polymer to agglomerate since it is desirable that the polymer particles remain as discrete entities either in the solid or molten state. Thus for example we have noted that if the contents of the reaction vessel are agitated excessively by being refluxed vigorously undesired agglomeration of the particles tends to occur.

The rate of cooling the molten polymer and the dispersing liquid to a point at which the polymer is again a solid is not narrowly critical and may be effected by known means for cooling liquids, solutions and dispersions of solids in liquids.

The process whereby the dispersion is formed and the resultant shaped polymer is separated from the dispersion may be performed either as a batchwise process or as a continuous operation. For batchwise operation the apparatus may be for example a reaction vessel which is fitted with a stirring mechanism, means of heating and cooling the contents and optionally a condensing device, should it be desirable to heat the dispersing medium to almost refluxing temperature. Separation of the resultant desired particles from the dispersing medium and removal of residual impurities from the separated particles by washing may be effected by known means.

The process may also be operated continuously by feeding a preheated powder dispersion in a liquid medium through a heated coil to raise the temperature from just below the melting temperature of the polymer in question to above the melting temperature at such a rate as to allow the molten polymer to reach a state suitable for the formation of spherical particles, followed by cooling, particle separation and washing by the usual means.

The quantity of liquid dispersing medium used in relation to the polymer varies from 2.5 to 25 parts by weight per 1 part of solid polymer, preferably between 3 to 20 parts of liquid dispersing medium per 1 part of solid polymer by weight. The concentration of polymer powder used is determined by the economics of stirring, heating and transferring solid dispersions.

The quantity of dispersion agent to be used depends on the nature of the dispersing or stabilizing agents chosen. The quantity should be sufficient to prevent agglomeration of the particles and we have found that amounts between 2.5 and 40 parts by weight of dispersing agent per 100 parts by weight of polymer are satisfactory and amounts between 5 and 30 parts by weight of dispersing agent per 100 parts by weight of polymer are preferred.

The concentration of solute chosen in the liquid dispersing medium depends on the desired maximum temperature and can be calculated or experimentally determined for the particular solute chosen.

The spherical polymer particles produced according to the present invention have an average size and size distribution substantially determined by the polymer powder feed used. It results in polymer powders which are usually similar in particle size to that of the original powder fed but composed of spherical shaped particles useful in many commercial applications where the flow of the powder is impotrant, or fluidisation is required, for example coating objects by immersion in a static or fluidised bath or by application with a powder. The powders are also useful for example as intermediate products in the preparation of expanded spherical powders for insulation purposes, and in the manufacture of ion exchange resins.

The invention is illustrated by the following examples by which means the invention should be more clearly understood. The examples should not be construed as being limiting.

EXAMPLES 1 TO 13 INCLUSIVE

In a reaction vessel consisting of a 3-neck 1000 ml. round-bottomed Pyrex flask provided with a stirrer, thermometer and condenser, a solution was prepared by dissolving 231 g. of calcium chloride in 300 g. of water. To this mixture was then added the type and amount of dispersing agent as set out for each example listed in Table I. Polyethylene powder consisting of irregularly shaped particles, which had a melt flow index of 7, a density of 0.919 g./cm.$^3$ and a melting point of 104.3° C. was sieved and that portion passing a 22 mesh BSS sieve but retained on a 52 mesh BSS sieve was recovered as a sieved sample of polyethylene. 40 g. of this sieved sample of polyethylene was added to the dispersing medium prepared above.

The resultant mixture was then heated, with stirring, to the temperature set out in Table I and maintained at this temperature for 1 minute. The contents of the flask were then cooled rapidly and the particles so obtained were filtered off, washed free of chloride ions and dispersing agents by successive washes with hot water and finally dried at 50° C. under vacuum. The particles were then examined microscopically and their shape ascertained. The shape of the particles is set out in Table I and designated as follows:

S=all particles spherical
SR=all particles rounded, not more than 60% spherical
RS=all particles rounded, a minor proportion spherical
A=agglomerates of particles.

These examples demonstrate means whereby irregularly shaped thermoplastic polymeric particles may be converted to spherical particles using different suspending agents.

TABLE 1.—EXPERIMENT CONDITIONS AND RESULTS OF EXAMPLES 1-13

| Example Number | Dispersing Agent | Quantity of Dispersing Agent, g. | Final Temperature, °C. | Particle shape | Polymer, Percent Ash |
|---|---|---|---|---|---|
| 1 | Polyvinyl alcohol, 98-100% hydrolysis viscosity 20 cps., 4% solution 20° C. | 1.5 | 105 | RS | <0.1 |
| 2 | do | 1.5 | 106 | SR | <0.1 |
| 3 | do | 1.5 | 109 | S | <0.1 |
| 4 | do | 1.5 | 112 | S+A | 0.23 |
| 5 | As for Example 4 but 10 g., of talc powder passing 200 mesh BSS was also added. | 1.5, 10 | 112 | S | |
| 6 | Polymethacrylic acid M.W 2×10$^4$ | 1.5 | 110 | SR | |
| 7 | Gelatine, commercial grade for human consumption. | 3 | 107 | RS | |
| 8 | Gelatine, talc | 3, 10 | 110 | S | <0.1 |
| 9 | do | 3, 10 | 107.5 | SR | <0.1 |
| 10 | "Pluronic" F98 | 4 | 122 | S | |
| 11 | do | 1 | 120 | S | <0.1 |
| 12 | "Pluronic" F68 | 2 | 110 | SR | <0.1 |
| 13 | "Tetronic" 908 | 3 | 115 | S | <0.1 |

EXAMPLES 14 TO 20 INCLUSIVE

In the apparatus used in Examples 1 to 13, a solution was prepared using 462 g. of calcium chloride and 300 g. of water. To this solution was added 4 g. of "Pluronic" F68. There was thus obtained a dispersing medium. To the dispersing medium so prepared polymeric powders of irregular particle shape and passing a 52 mesh BSS sieve but retained on a 200 mesh BSS sieve were added. The quantity of powder, the nature of the polymer and the final temperature are recorded in Table II.

The mixture was heated while being stirred mildly to the temperature specified, held at this temperature for 2 minutes, cooled rapidly and the resultant product filtered off, washed and dried, as in Examples 1 to 13.

The resultant product was then examined microscopically and the shape of the particles ascertained. The shape of the particles is set out in Table II wherein it is designated using the same designation as used in Examples 1 to 13.

These examples demonstrate means whereby irregularly shaped thermoplastic polymer particles may be converted to spherical particles.

TABLE II.—EXPERIMENTAL CONDITIONS AND RESULTS OF EXAMPLES 14–20

| Ex No. | Polymer powder used | Quantity of powder added, g | Final temp., °C | Shape of particles |
|---|---|---|---|---|
| 14 | High density polyethylene, SG 0.96 g./cm.$^3$, MFI 3. | 60 | 142 | S |
| 15 | Medium density polyethylene, SG 0.935 g./cm.$^3$, MFI 2. | 100 | 133 | S |
| 16 | Low density polyethylene, SG 0.919 g./cm.$^3$, MFI 2. | 40 | 122 | S |
| 17 | Low density high molecular weight polyethylene, SG 0.919 g./cm.$^3$, MFI 0.01. | 60 | 131 | S |
| 18 | Poly(ethylene-co-acrylic acid) 30% acrylic acid. | 30 | 130 | S |
| 19 | Polymethyl methacrylate, M.W. 500,000. | 50 | 163 | SR |
| 20 | Poly(ethylene-co-vinyl acetate) 14% vinyl acetate, density 0.940 MFI 7. | 30 | 132 | S |

EXAMPLE 21

In a reaction vessel consisting of a 3-neck 20 litre flask provided with a stirrer, thermometer and condenser, a solution was prepared using 9240 g. of calcium chloride and 6000 g. of water. To this solution was added 80 g. of "Pluronic" F68. There was thus obtained a dispersing medium. To the dispersing medium so prepared was added 2400 g. of low density polyethylene having a specific gravity of 0.919 g./cm.$^3$ and a melt flow index of 2. Using these quantities of materials the procedure used in Example 16 was repeated. The particles obtained were examined microscopically and shown to be in spherical form. This example demonstrates a means whereby spherical particles may be obtained using a batchwise process.

EXAMPLE 22

In a reaction vessel consisting of a 3-neck 20 litre flask having a bottom outlet and provided with a stirrer, thermometer and condenser a solution was prepared using 9240 g. calcium chloride and 6000 g. water. To this solution was added 80 g. "Pluronic" F68. There was thus obtained a dispersing medium. To the dispersing medium so prepared was added 2400 g. low density polyethylene having a specific gravity of 0.919 g./cm.$^3$ and a melt flow index of 2. From lengths of Pyrex glass tubing having an internal diameter of 3/8", two coils were prepared each having six turns in a length of 6 feet. One coil was connected to the reaction vessel and immersed in an oil bath maintained at a temperature of about 200° C. The second coil was connected to the first coil and immersed in a cooling bath. A filtering device was placed at the end of the second tube, and means were provided for continuously cycling liquid from the receiver of the filter to a heated reaction vessel of 5000 ml. capacity. The dispersing medium was cycled from the reaction vessel through the first heated coiled tube, thence through the second cooled tube; the resultant particles were filtered from the liquid medium on the filtering device and the mother liquor from the filtration was returned to a vessel acting as a make-up container wherein the mother liquor was adjusted to the concentration of the original dispersing medium, further polyethylene was added and the resultant mixture was then recycled to the reaction vessel. The rate of flow of the dispersing medium and the polyethylene therewith and the temperature of the cooling bath were adjusted so that the exit temperature of the dispersing medium and polyethylene from the heated coil was 136° C. and its exit temperature from the cooled coil was 93° C. Microscopic examination of the recovered polyethylene particles showed that they were in spherical form. This example demonstrates a means whereby spherical particles may be obtained using a continuous process.

EXAMPLE 23

Commercially available polyvinyl chloride powder "Corvic" D65/6 (registered trademark, Imperial Chemical Industries Limited) was sieved and that portion passing a 100 mesh BSS sieve but retained on a 120 mesh BSS sieve was recovered. 100 g. of this recovered polyvinyl chloride was mixed with 30 g. of dibutyl phthalate and 3 g. of a commercially available tin stabilizer "Advastab" 17M (registered trademark, Advance Solvents and Chemical Corporation) to form a dry blend of plasticised, stabilised polyvinyl chloride in powdery form.

A solution of 462 g. of calcium chloride in 300 g. of water was prepared in a 1000 ml. 2-neck Quickfit Pyrex glass round-bottomed flask; 6 g. of a commercially available polyvinyl alcohol "Elvanol" Grade 52–22 (registered trademark, E. I. du Pont de Nemours and Co. Inc.) was added and the contents of the flask were stirred until homogeneity was achieved. To this solution was added 100 g. of the plasticised, stabilised polyvinyl chloride prepared above, and the resultant mixture was heated to 150° C. with mild stirring over a period of 30 minutes. The temperature of the mixture was then maintained at 150° C. for 5 minutes, and then cooled rapidly to 50° C., stirring being maintained whilst the cooling operation was in progress. The insoluble product was then filtered from the solution, washed free of calcium chloride with successive portions of hot water and dried under vacuum. The resultant powdery product was examined microscopically and found to consist of clear spherical particles. This example demonstrates a means whereby plasticised, stabilised, thermoplastic polymeric products may be obtained in spherical form.

EXAMPLE 24

Into a 20 litre flanged Quickfit flask provided with a lid, stirrer gland, anchor stirrer and thermocouple pocket was placed a solution prepared from 12 kg. calcium chloride in the form of anhydrous flakes and 6 l. water. To this solution was added 200 g. "Pluronic" F68 and 1500 g. of a polyethylene powder.

The polyethylene powder referred to above was prepared as follows: Using a 2 roll mill heated to 160° C. a uniform crepe was formed by known means from 1000 g. polyethylene granules having a melt flow index of 2 and available commercially from Imperial Chemical Industries of Australia and New Zealand Limited under the trade name of "Alkathene" XJF123, together with 1750 g. zirconia ($ZrO_2$) in powdered form, and 20 g. of an antioxidant available commercially from Imperial Chemical Industries of Australia and New Zealand Limited under the trade name of "Topanol" OC. After milling for 10 minutes the crepe so formed was removed from the mill and transferred to a chipper whereby the crepe was converted to a granular form. The granules were then ground to a powder using a Pallman mill. A representative sample of the powder had the following sieve analysis using BSS sieves:

Passing 10 mesh but retained on 22 mesh, 6.9%
Passing 22 mesh but retained on 36 mesh, 27.5%
Passing 36 mesh but retained on 52 mesh, 21.2%
Passing 52 mesh but retained on 100 mesh, 21.4%
Passing 100 mesh, 23.0%

The stirred dispersion in the flask was heated over a period of 10 minutes to 117° C. maintained at this temperature for 3 minutes and then cooled to 80° C. The resultant product was separated from the mother liquor by filtration, washed with hot water until the washings were free of chloride, dried and sieved through a 10 mesh BSS sieve. There was thus obtained 1482 g. of particles which were shown by microscopic examination to be spherical.

EXAMPLE 25

Using the method described in Example 24 a polyethylene powder was prepared. The composition of the powder was as described in Example 24 except that the zirconia was replaced by an equal weight of stannic oxide ($SnO_2$). A representative sample of the powder had the following sieve analysis using BSS sieves:

Passing 10 mesh but retained on 22 mesh, 4.7%
Passing 22 mesh but retained on 36 mesh, 19.9%
Passing 36 mesh but retained on 52 mesh, 16.9%
Passing 52 mesh but retained on 100 mesh, 42.0%
Passing 100 mesh, 16.5%

Into the apparatus described in Example 24 was placed a solution prepared from 12 kg. calcium chloride in the form of anhydrous flakes and 6 l. water. To this solution was added 150 g. "Pluronic" F98, 200 g. of a dispersing agent "Decalite" 3000 ("Decalite" is a registered trademark) and 1250 g. of the polyethylene powder prepared above. The dispersion so formed was heated, whilst being stirred, over a period of 10 minutes to 120° C., maintained at this temperature for 1 minute and then cooled to 80° C. The particles so formed were separated from the remainder of the dispersion by filtration, washed with hot water to remove the fine particles of "Decalite" 3000, washed further until the washings were free of chloride, dried and sieved through a 10 mesh BSS sieve. There was thus obtained 1213 g. of particles which were shown by microscopic examination to be spherical.

EXAMPLE 26

Example 25 was repeated, except that the "Decalite" 3000 was omitted. Only 1000 g. of spherical particles were obtained due to the formation of coarse agglomerates of particles and build-up of material on the walls of the flask and the surface of the stirrer.

EXAMPLES 27 TO 34 INCLUSIVE

A commercial pigmented polyethylene in the form of chip, formed from polyethylene having a melt flow index of 7 and containing 16.6% w./w. of titanium dioxide, available from Imperial Chemical Industries of Australia and New Zealand Limited under the trade name of "Alkathene" White 1002/7/300 was ground to a powder in a Pallman mill. A representative sample of the powder so formed had the following sieve analyses using BSS sieves:

Passing 22 mesh but retained on 36 mesh, 1.2%
Passing 36 mesh but retained on 52 mesh, 1.4%
Passing 52 mesh but retained on 100 mesh, 83.9%
Passing 100 mesh but retained on 150 mesh, 10.0%
Passing 150 mesh but retained on 200 mesh, 2.0%
Passing 200 mesh, 1.5%

Into the apparatus described in Example 24 was placed a solution prepared from 12 kg. calcium chloride in the form of anhydrous flakes and 6 l. water. To this solution was added varying amounts of "Pluronic" F98 and the polyethylene powder prepared above as set out in Table III.

TABLE III

| Example | Polyethylene powder, kg | "Pluronic" F98, kg | Spherical particles obtained, percent |
|---|---|---|---|
| 27 | 2.5 | 0.25 | 98.0 |
| 28 | 3.0 | 0.3 | 97.9 |
| 29 | 3.5 | 0.3 | 97.2 |
| 30 | 4.0 | 0.3 | 96.9 |
| 31 | 4.5 | 0.3 | 96.6 |
| 32 | 5.0 | 0.3 | 96.5 |
| 33 [1] | 5.0 | 0.2 | ([2]) |
| 34 [3] | 5.0 | 0.2 | 96.7 |

[1] In example 33 the resultant product consisted substantially of agglomerated particles.
[2] Very small amount.
[3] In Example 34 0.2 kg. of "Decalite" 3000 was also added.

In each of the examples the stirred dispersion in the flask was heated over a period of about 10 minutes to 118° C., maintained at this temperature for 5 minutes and then cooled to 80° C. The particulate matter was separated from the liquid medium by filtration, washed with hot water until free of chloride and "Decalite" when present and dried. The resultant product was then sieved through a 10 mesh sieve to separate agglomerated particles and the weight of spherical particles so obtained was determined. This value is set out in Table III expressed as a percentage of the original weight of the polyethylene powder used. In Example 33 there was considerable agglomeration of particles, but when this example was repeated with the addition of "Decalite" 3000 in Example 34 spherical particles were obtained in good yield without appreciable agglomeration.

These examples demonstrate the effect on yield as a result of varying the polymer concentration in the dispersion, and also as a result of varying the concentration of, or altering the composition of, the dispersing agent.

EXAMPLE 35

A 1 gallon heavy duty laboratory mixer was charged with 0.75 gallon of a dispersion prepared from 12 kg. calcium chloride in the form of anhydrous flakes, 6 l. water, 500 g. "Pluronic" F98 and 7 kg. polyethylene powder prepared as described in Examples 27 to 34. Over a period of 1 hour the contents of the mixer were stirred mildly whilst being heated to 118° C. When this temperature was reached it was not further maintained at this temperature, in contradistinction to the procedure used in previous examples, but after a few seconds was transferred rapidly into a vessel holding 4 gallons of water at 80° C. The water was stirred mildly during the act of transfer and the stirring of the contents of the vessel was continued until the contents of the mixer were evenly dispersed throughout the water. The particles so formed were separated by filtration, washed with hot water until the washings were free of chloride and dried. There was thus obtained a powder which, when examined microscopically, was shown to consist of spherical particles. This example demonstrates a method whereby spherical particles may be obtained from a dispersion having a dough-like consistency.

EXAMPLE 36

Example 24 was repeated but the zirconia and "Alkathene" XJF124 were omitted and were replaced by 1000 g. polyethylene granules having a melt flow index of 0.3 and available commercially from Imperial Chemical Industries of Australia and New Zealand Limited under the Trade Name of "Alkathene" XBG/33. The particles so obtained were shown by microscopic examination to be spherical.

EXAMPLE 37

In a reaction vessel consisting of a 3-neck 20 litre flask provided with a stirrer, thermometer and condenser a solution was prepared from 12 kg. calcium chloride in the form of anhydrous flakes and 6 l. water. To this solution was added 200 g. "Pluronic" F68 and 1500 g. of a polythylene powder passing a 22 mesh BSS sieve, having a melt flow index of 7 and available commercially from Imperial Chemical Industries of Australia and New Zealand Limited under the Trade Name of "Alkathene" 14/300. The stirred dispersion in the flask was heated over a period of 10 minutes to 117° C., maintained at this temperature for 3 minutes and then cooled to 80° C. The particulate matter was separated from the mother liquor by filtration, washed with hot water until the washings were free of chloride, dried and sieved through a 10 mesh BSS sieve. There was thus obtained particles which were shown by microscopic examination to be spherical.

EXAMPLE 38

Example 37 was repeated but the "Alkathene" 14/300 was replaced by a polyethylene powder having a melt flow index of 20 and available from Imperial Chemical Industries of Australia and New Zealand Limited under the trade name of "Alkathene" 21/300. The resultant product consisted of spherical particles.

EXAMPLE 39

Example 37 was repeated but the "Alkathene" 14/300 was replaced by a polyethylene powder having a melt flow index of 30 and availble from Imperial Chemical Industries of Australia and New Zealand Limited under the trade name of "Alkathene" 136/300. The resultant product consisted of spherical particles.

EXAMPLES 40 TO 42 INCLUSIVE

The polyethylene powders used as raw materials and the products derived therefrom described in Examples 25, 27 and 37 were submitted to a sieve analysis using BSS sieves the results of which are set down in Table IV. Example 40 relates to the original powder and derived particles described in Example 25; Example 41 relates to Example 27; and Example 42 relates to Example 37.

These examples demonstrate the similarity of the particle size distribution of the original powder used as the raw material to that obtained in the resultant particles. In certain instances there was a displacement of the particle size distribution of the resultant product when compared with that of the original powder used, since the resultant product consisted of spherical particles whereas the original powder used was of irregular particle shape and where it had been obtained by use of a Pallman mill the particles often tended to have an elongated form.

sieve but retained on a 100 mesh BSS sieve. The resultant product had the following sieve analysis.

Passing 36 mesh but retained on 52 mesh, 7.8%
Passing 52 mesh but retained on 100 mesh, 91.3%
Passing 100 mesh, 0.9%

This example demonstrates characteristics similar to those of Example 43.

EXAMPLES 45 TO 50 INCLUSIVE

In a reaction vessel consisting of a 3 neck 20 litre flask provided with a stirrer, thermometer and condenser a solution was prepared from 9 kg. calcium chloride in the form of anhydrous flakes and 6 l. water. To this solution were added varying amounts of "Pluronic" F98 as set out in Table V to form dispersions and to these dispersions was added 1100 g. of a polyethylene powder "Alkathene" 14/300.

The stirred dispersion so formed in each case was heated over a period of 10 minutes to 115° C., maintained at this temperature for 3 minutes and cooled to 80° C. The resultant particles were separated from the dispersing medium by filtration, washed with hot water until free of chloride and dispersing agent and dried. The dried product was examined microscopically to ascertain the shape of the particles so obtained and the results obtained are set out in Table V.

TABLE V

| Example No. | "Pluronic" F98 added, g. | Shape of particles |
| --- | --- | --- |
| 45 | 300 | Spherical. |
| 46 | 200 | Do. |
| 47 | 100 | Do. |
| 48 | 50 | Do. |
| 49 | 25 | Spherical and some agglomerates. |
| 50 | 10 | Do. |

TABLE IV

| | Example 40 | | Example 41 | | Example 42 | |
| --- | --- | --- | --- | --- | --- | --- |
| | Stannic oxide filled powder referred to in Example 25 | | "Alkathene" white powder 1002/7/300 referred to in Example 27 | | "Alkathene" 14/300 powder referred to in Example 37 | |
| Fraction | Original Powder | Derived Particles | Original Powder | Derived Particles | Original Powder | Derived Particles |
| Retained on 10 mesh | 0 | 0 | 0 | 0 | 0 | 0 |
| Passing 10 mesh but retained on 22 mesh | 4.7 | 22.6 | 0 | 0 | 0 | 0 |
| Passing 22 mesh but retained on 36 mesh | 19.9 | 31.2 | 1.2 | 6.4 | 0.2 | 0.8 |
| Passing 36 mesh but retained on 52 mesh | 16.9 | 24.2 | 1.4 | 7.7 | 0.2 | 11.5 |
| Passing 52 mesh but retained on 100 mesh | 42.0 | 16.0 | 83.9 | 71.9 | 69.2 | 76.7 |
| Passing 100 mesh but retained on 150 mesh | 16.5 | 6.0 | 10.0 | 11.0 | 20.8 | 8.6 |
| Passing 150 mesh but retained on 200 mesh | | | 2.0 | 2.8 | 6.4 | 1.6 |
| Passing 200 mesh | | | 1.5 | 0.2 | 3.2 | 0.8 |

EXAMPLE 43

In a reaction vessel consisting of a 3 neck 20 litre flask provided with a stirrer, thermometer and condenser a solution was prepared from 9 kg. calcium chloride in the form of anhydrous flakes and 4.5 l. water. To this solution was added 100 g. "Pluronic" F68 and 1100 g. of a polyethylene powder "Alkathene" 14/300 using that portion of the powder passing a 22 mesh BSS sieve but retained on a 36 mesh BSS sieve. The resultant particles were obtained by the method described in Example 37. They were submitted to a sieve analysis using BSS sieves with the following results:

Passing 10 mesh but retained on 22 mesh, 12.1%
Passing 22 mesh but retained on 36 mesh, 85.3%
Passing 36 mesh, 2.6%

This example demonstrates that the particle size of the resultant product is substantially similar to that of the original powder fed but that there is a higher proportion of coarse particles in the resultant product since it is in spherical form whereas the original powder contains irregularly shaped particles some of which may, because of their shape, be capable of passing through the coarser sieve.

EXAMPLE 44

Example 43 was repeated but the original powder passing a 22 mesh BSS sieve but retained on a 36 mesh BSS sieve was replaced by a portion passing a 52 mesh BSS These examples demonstrate the effect of concentration of dispersing agent in the dispersion on the degree of agglomeration of the particles in the resultant product.

EXAMPLE 51

Example 50 was repeated but in addition 100 g. "Decalite" 3000 was added to the dispersion prior to the heating step. The resultant product consisted of spherical particles without agglomerates. This example demonstrates the effect on the degree of agglomeration by the use of mixed dispersing agents.

EXAMPLE 52

Example 51 was repeated but the "Decalite" 3000 was replaced by a similar amount of "Decalite" 5000 which is a finely divided solid. The resultant product was comprised substantially of spherical particles having less agglomerates than the product obtained in Example 50, but more agglomerates than the product of Example 51.

EXAMPLE 53

Example 51 was repeated but the "Decalite" 3000 was replaced by a similar amount of colloidal silica. The resultant product consisted of spherical particles.

EXAMPLE 54

In a 20 litre flask provided with a stirrer, thermometer and condenser a saturated solution of calcium chloride was prepared from 183 kg. calcium chloride in the form of anhydrous flakes and 6 l. water. To this solution was added 300 g. "Pluronic" F98 and 1500 g. of polypropylene powder. The polypropylene powder was prepared from polypropylene in granular form and having a melt flow index of 3 and available from Imperial Chemical Industries Limited under the trade name of "Propathene" GWE–21. The polypropylene granules were ground in a Pallman mill to a powder, a representative sample of which had the following sieve analysis using BSS sieves.

Passing 10 mesh but retained on 22 mesh, 5.1%
Passing 22 mesh but retained on 36 mesh, 19.5%
Passing 36 mesh but retained on 52 mesh, 31.7%
Passing 52 mesh but retained on 100 mesh, 42.0%
Passing 100 mesh, 1.7%

The stirred dispersion was heated over a period of 10 minutes to 172° C., maintained at this temperature for 6 minutes, cooled to 110° C. The dispersion was then diluted with hot water, and the resultant solids were separated from the dispersing medium by filtration, then washed with hot water until free of chloride and dispersing agent. The resultant product after being dried was found on microscopic examination to consist of spherical particles.

EXAMPLE 55

Example 24 was repeated but the "Pluronic" F68 used therein was replaced by the same amount of "Pluronic" F108. There was thus obtained 1472 g. of particles which were similar to those obtained in Example 24.

EXAMPLE 56

Example 24 was repeated but the "Pluronic" F68 used therein was replaced by the same amount of "Pluronic" F85. There was thus obtained 1487 g. of particles which were similar to those obtained in Example 24.

EXAMPLE 57

Example 24 was repeated but the "Pluronic" F68 used therein was replaced by the same amount of a block copolymer of the type AB of a molecular weight of approximately 14,000, with a polyoxypropylene block having a molecular weight of approximately 3000 and a polyoxyethylene block having a molecular weight of approximately 11,000. Such a block copolymer is available from Imperial Chemical Industries of Australia and New Zealand Limited under the registered trade name of "Teric" 200. There was thus obtained 1468 g. of particles which were similar to those obtained in Example 24.

EXAMPLE 58

Example 24 was repeated, but the time for which the dispersion was maintained at a temperature of 117° C. was increased from 3 minutes to 21 minutes. There was thus obtained 1497 g. of particles which were similar to those obtained in Example 24. This example demonstrates that with a suitable choice of dispersant, the use of prolonged times at the maintenance temperature gives satisfactory yields of product.

EXAMPLE 59

Into a 1000 ml. 3 necked flask provided with a thermometer, stirrer and condenser were charged 480 g. water, 20 g. ethyl alcohol, 10 g. "Pluronic" F98 and 50 g. powdered hydrocarbon wax with a melting point of 57° C. The dispersion so formed in the flask was heated over a period of 30 minutes to 63° C. whilst being agitated mildly, held at this temperature for about 1 second and then cooled to 30° C. The contents of the flask were filtered, and the insoluble portion was washed with successive quantities of water to remove the dispersant and ethyl alcohol. The solids so recovered were dried under vacuum at room temperature to yield 46 g. of particles the majority of which were found, on microscopic examination, to be substantially spherical.

EXAMPLE 60

Into a 1000 ml. 3 necked flask provided with a thermometer, stirrer and condenser were charged 300 ml. glycerol, 200 ml. water, 10 g. "Pluronic" F98 and 50 g. of a polyethylene powder "Alkathene" 14/300. The stirred dispersion was heated over a period of 20 minutes to 110° C. held at this temperature for 5 seconds and then cooled to 70° C. The resultant particulate matter was separated from the mother liquor by filtration washed with water to remove the glycerol and dispersing agent and dried. There was thus obtained a powder which, when examined microscopically, was shown to consist of spherical particles together with some agglomerated material which was removed by sieving.

EXAMPLE 61

In a reaction vessel consisting of a 3 neck 20 litre flask provided with a stirrer, thermometer and condenser a solution was prepared from 18 kg. calcium chloride in the form of anhydrous flakes and 6 l. water and to this solution was added 300 g. "Pluronic" F98. To the dispersing medium so formed was added 2000 g. polyethylene powder "Alkathene" 14/300 powder passing a 22 mesh BSS sieve. The polyethylene powder had a melting point of 108° C. The dispersion so formed was stirred mildly whilst being heated over a period of 4 hours to 117° C. A sample of the dispersion taken from the flask at this temperature was shown by microscopic examination to contain spherical particles. Heating of the dispersion was continued and samples were taken and examined as previously described at intervals as the temperature of the dispersion was increased. Spherical particles without agglomerates were found to be present in each of the samples taken at temperatures as high as and including 128° C.

EXAMPLE 62

Example 61 was repeated and at a temperature of 128° C. spherical particles only were shown to be present in the dispersion. When the temperature of the dispersion was raised to 132° C. the particles in a sample of the contents of the flask taken at this temperature were shown to be in the form of agglomerates. This example demonstrates that overheating of the dispersion causes undesirable agglomeration of the particles.

I claim:
1. A process for the manufacture of substantially spherical polymeric particles which comprises
dispersing and mildly stirring solid, non-spherical thermoplastic polymeric particles in a liquid medium which is non-reactive with and is not a solvent for said polymer in the presence of at least one dispersing agent wherein the ratio of total dispersing agent present is in the range from 2.5 to 40 parts by weight of dispersing agent per 100 parts by weight of thermoplastic polymer,
heating while mildly stirring said dispersion at atmospheric pressure to a temperature above, but not more than 20° C. above the melting point of said thermoplastic polymer,
maintaining said dispersion at said temperature by said mild stirring until the polymer particles attain substantially spherical shape while preventing agglomeration of said particles,
then cooling said particles to a temperature below their melting point.

2. A process according to claim 1 wherein the thermoplastic polymer is selected from the group consisting of polyolefins, polyvinyl halides, olefin-vinyl copolymers, olefin-acrylate copolymers, polymethyl acrylates, polyethyl acrylates, polymethyl methacrylates and polyethyl methacrylates.

3. A process according to claim 1 wherein the thermoplastic polymer is selected from the group consisting of polyethylene, polypropylene, polyethylene-co-acrylic acid, polyethylene-co-vinyl acetate and polyvinyl chloride.

4. A process according to claim 1 wherein the thermoplastic polymer is compounded or blended with plasticizers.

5. A process according to claim 1 wherein the liquid medium is an aqueous solution of an inorganic salt.

6. A process according to claim 1 wherein the liquid medium is an aqueous solution of calcium chloride.

7. A process according to claim 1 wherein the liquid medium is an aqueous solution of materials selected from the group consisting of alkanols and polyhydric alcohols.

8. A process according to claim 1 wherein the dispersing agent is a block copolymer of ethylene oxide and propylene oxide.

9. A process according to claim 1 wherein the dispersion is heated to a temperature in the range from 60° C. to 180° C.

10. A process according to claim 1 wherein the ratio of liquid medium to thermoplastic polymer is in the range from 2.5 to 25 parts by weight of liquid medium per 1 part by weight of thermoplastic polymer.

11. A process according to claim 1 in which the thermoplastic polymer is compounded or blended with stabilizers.

12. A process according to claim 1 in which the thermoplastic polymer is compounded or blended with pigments.

13. A process according to claim 1 in which the thermoplastic polymer is compounded or blended with fillers.

References Cited

UNITED STATES PATENTS

| | | | |
|---|---|---|---|
| 2,652,386 | 9/1953 | Wallman | 264—14 |
| 3,019,485 | 2/1962 | Diamond | 264—15 |
| 3,229,002 | 1/1966 | Feder | 264—15 |

FOREIGN PATENTS 904,211  8/1962  England.

R. WHITE, Primary Examiner

J. R. HALL, Assistant Examiner